United States Patent [19]

Walder

[11] 4,341,633
[45] Jul. 27, 1982

[54] SURFACE AERATION SYSTEM WITH CONTROLLED AERATOR SUBMERGENCE

[75] Inventor: Thomas E. Walder, Newfane, N.Y.

[73] Assignee: Linde Aktiengesellschaft, Wiesbaden, Fed. Rep. of Germany

[21] Appl. No.: 938,029

[22] Filed: Aug. 30, 1978

Related U.S. Application Data

[63] Continuation of Ser. No. 551,681, Oct. 17, 1974, abandoned.

[51] Int. Cl.³ .............................. C02F 3/16; C02F 3/26
[52] U.S. Cl. .................................... 210/614; 210/628; 210/96.1; 210/130; 210/143; 210/195.3; 210/219
[58] Field of Search ............... 73/59, 290 R; 210/4-7, 210/14, 15, 96 R, 97, 103, 104, 143, 195 S, 197, 220, 221 R; 261/26, 27, 29, 36 R, 87, 91, 93

[56] References Cited

U.S. PATENT DOCUMENTS

| | | | |
|---|---|---|---|
| 2,125,722 | 8/1938 | Hawkins | 73/290 R X |
| 2,987,185 | 6/1961 | Feeney | 210/97 |
| 3,213,670 | 10/1965 | MacGeorge | 73/290 R X |
| 3,342,727 | 9/1967 | Bringle | 210/96 X |
| 3,426,899 | 2/1969 | Smith | 210/96 R |
| 3,497,386 | 2/1970 | Steele et al. | 210/143 X |
| 3,503,593 | 3/1970 | Nelson | 261/29 |
| 3,547,811 | 12/1970 | McWhirter | 210/15 X |
| 3,547,815 | 12/1970 | McWhirter | 210/15 X |
| 3,630,496 | 12/1971 | Hurst et al. | 261/26 |
| 3,660,277 | 5/1972 | McWhirter et al. | 210/15 X |

Primary Examiner—Robert H. Spitzer
Attorney, Agent, or Firm—Millen & White

[57] ABSTRACT

Means and method for controlling submergence of surface aeration apparatus in enclosed covered aeration zones wherein liquid level is dependent on pressure of the overlying gas volume. Power consumption of the surface aeration device is sensed by a transducer coupled in controlling relationship with means for regulating the flow of aeration gas passed through the aeration zone. Changes in power consumption caused by liquid level variation are employed to adjust the flow rate of gas passed through the aeration zone, thereby adjusting the gas pressure in the zone to maintain liquid level therein relatively constant.

7 Claims, 6 Drawing Figures

SURFACE AERATION SYSTEM WITH CONTROLLED AERATOR SUBMERGENCE

This application is a continuation of our prior U.S. application: Ser. No. 551,681 filing date Oct. 17, 1974, now abandoned.

BACKGROUND OF THE INVENTION

This invention relates generally to method of and apparatus for controlling liquid level and power consumption in liquid treatment systems wherein surface aeration devices are employed in enclosed covered chambers to promote the dissolution of a gas into a liquid.

In the practice of oxygenation of BOD-containing water as taught by U.S. Pat. Nos. 3,547,812–3,547,815 to J. R. McWhirter et al, at least one enclosed covered aeration chamber is employed wherein the liquid undergoing treatment is intimately contacted in the presence of activated sludge with oxygen-enriched gas from an overlying gas space to dissolve the oxygen necessary for aerobic biological activity. Such oxygenation systems provide substantial advantages over prior art treatment systems wherein atmospheric air is used as the oxidant in open aeration chambers. For example, the closed chamber oxygenation system is able to operate at biological suspended solids levels several times greater and aeration detention periods several times less than those of air aeration systems while maintaining comparable or better overall levels of treatment. Such advantages are a consequence of the higher mass transfer driving force for oxygen-enriched gas relative to air, which permits higher dissolved oxygen levels to be achieved with economic levels of volumetric oxygen transfer rate per unit of power input. A particularly effective method for obtaining high economic utilization of oxygen gas in the aeration feed gas is disclosed in U.S. Pat. No. 3,547,812, wherein the feed gas comprises at least 60% oxygen (by volume) and the oxygen feed gas to total (mixing plus gas-liquor contact) energy ratio is maintained at 0.03–0.40 lb. moles oxygen per horsepower hour of energy supplied. In order to suitably employ such feed gas-energy ratios, it is necessary that the energy supplied to the aeration zone be used efficiently to generate the gas-liquor interfacial area required for oxygen solution. Mixing energy must also be employed to hold the solids uniformly in suspension and to circulate the mixed liquor repeatedly through the gas-liquor contactor. For these reasons, it is taught by the aforementioned patent to use an aeration device whose standard air transfer efficiency is at least 1.5 and preferably 2.5 lb. oxygen/horsepower hour in order that the oxygen may be dissolved rapidly despite the relatively small volume of gas fed to the system, and in order that the biological solids are not damaged and dispersed.

In practice surface aeration devices are often used in the aforementioned oxygenation systems to achieve the desired levels of gas-liquid contacting. These devices are disposed at or near the surface of the liquid to be treated and project relatively large sheets or streams of liquid into the gas phase overlying the liquid pool, thereby providing extensive interfacial area for mass transfer while promoting circulation and fluid mixing in the bulk liquid volume. Surface aerators may be of various types, as for example relatively low speed rotating impellers, disks, or brush devices or high speed propellers mounted in draft tubes. Such devices can provide high rates of oxygen transfer, e.g. 2–4 lb. oxygen/hour per unit of total horsepower input, and thus represent highly efficient means for effecting gas/liquid contact. In contrast to other aeration devices such as diffusers and submerged turbine rotating spargers, surface aerators are not susceptible to clogging by solids, are relatively simple mechanically and do not require gas recirculation compressors and associated piping.

In spite of their desirable features, however, certain disadvantages have become apparent as surface aeration devices have been employed for the treatment of BOD-containing water in closed oxygenation chambers. Surface aeration units are inherently sensitive to changes in liquid submergence, which can greatly affect their efficiency, power requirements and stability of operation. Operation at too shallow an aerator submergence provides insufficient oxygen dissolution for the process requirements and may result in mechanically unstable operation which can drastically shorten equipment life. Alternatively, too great a submergence may result in deleterious overloading of the drive means, e.g., burnout of an electrical motor, and necessitate the shutdown of the treatment system. In addition, operation at too high or too low a submergence will frequently result in cyclic projected liquid patterns and wave motion at the liquid surface, accompanied by severe power surges. For these reasons, the range of tolerable submergence levels for a given surface aeration device may be quite narrow, as for example 2–3 inches overall. Nonetheless, liquid level changes due to pumping cycles within the liquid treatment facility or variations in the influent hydraulic loading may result in liquid submergences which are outside of the desired submergence limits by a factor of two or more in a system lacking means for liquid level control. Under such conditions, the increase in power draw from low submergence to high submergence levels may be substantial, e.g., greater than 60%.

Heretofore, closed chamber oxygenation systems have generally employed a respirometer method of oxygen feed control whereby the feed gas flow control means are responsive to a slight, predetermined superatmospheric pressure in the gas space of the oxygenation chamber. In practice, a simple pressure sensor is positioned in the aeration chamber cover to detect changes in gas space pressure resulting from a decrease or increase in oxygen uptake, as flow of or strength of the influent liquid changes. A control signal based on the pressure sensing is then generated and relayed to a flow control valve on the inlet aeration gas line which adjusts gas flow to maintain the desired set point gas pressure in the oxygenation chamber. Thus, if process changes result in a lowering of gas pressure in the chamber gas space, for example, the control valve will open causing more oxygen-enriched gas to flow to the system. This simple control circuit provides steady, uniform feed of oxygen gas and is usually responsive solely to the oxygen demand and/or mass transfer capability of the system. The selected superatmospheric pressure which it maintains within the oxygenated chamber is only sufficient to reject spent gas from the chamber and is dependent upon the flow resistance of the gas venting means which in turn are usually adjusted to optimize oxygen utilization in the chamber.

Despite its comparatively rapid response to changes in oxygen demand placed on the oxygenation system, however, the above described respirometer system achieves no direct control over liquid level in the closed chamber. In other words, a given gas pressure setting for the oxygenation chamber can be maintained regardless of the liquid level therein. If the influent flow rate of liquid to the oxygenation system varies, then the liquid level in the oxygenation chamber will change correspondingly with the extent of liquid level change depending upon the type of liquid discharge means used to control liquid inventory in the system. In practice, the liquid discharge means generally include a discharge weir which may be disposed external of the oxygenation chamber as for example in a clarification basin downstream from the chamber or alternatively may be positioned in the oxygenation chamber.

If a weir is employed externally of the covered chamber to control liquid level therein and if the oxygen supply to the chamber is regulated in accordance with the respirometer method, then variations in gas pressure within the closed chamber, caused for example by altering the flow resistance of the gas venting means, can produce severe changes in liquid level, with the aforedescribed adverse effects on surface aeration devices positioned in the oxygenation chamber. The severity of the liquid level changes under such conditions is due to the fact that external weir system behaves similar to a manometer in that an increase in gas space pressure displaces liquid from the oxygenation chamber until balance is restored between the respective hydrostatic pressures inside and outside of the chamber.

A further problem encountered with the combination of respirometer control and external weir liquid discharge in the oxygenation system is that liquid level changes therein due to hydraulic load variations tend to be reinforced rather than minimized by the system response. A rise or fall in the liquid level in the oxygenation chamber tends to correspondingly compress or expand the body of gas overlying the liquid. Absent the respirometer-controlled feed gas flow control valve, variations in liquid level attendant hydraulic load changes would be dampened by the "cushioning" effect of the gas volume in the chamber. However, the respirometer-controlled valve reacts in such a way as to eliminate the dampening effect of the gas thereby creating submergence conditions potentially detrimental to surface aeration devices disposed in the oxygenation chamber. For example: when hydraulic load on the treatment system is suddenly decreased, the liquid level in the oxygenation chamber will tend to drop. With such occurrence, the pressure in the gas space will drop due to rapidly increasing volume of the gas space. Pressure will fall below the set point pressure, as detected by the pressure sensor. The respirometer system will then send a control signal to further open the feed gas supply valve, to feed more oxygen-enriched gas into the chamber and thereby increase the gas space pressure. In this manner, the control system tends to depress the liquid level so that surface aerator submergence may remain too shallow. When the hydraulic load on the oxygenation system is suddenly increased, the liquid level in the chamber rises and the gas space volume is correspondingly decreased by compression, so that the gas space pressure increases. Such pressure increase is sensed by the control means, which then act to reduce the gas space pressure by further closing the oxygen aeration gas supply valve. This control system thus may tend to maintain the surface aerator at an excessive submergence under such conditions, with the aforementioned deleterious consequences to the aeration apparatus.

In the other past applications of the closed chamber oxygenation systems where the discharge weir is positioned internally of the chamber, the liquid level and liquid discharge rate are relatively insensitive to variations in gas pressure in the chamber, regardless of the type of oxygen gas feed control. However, with such provision, the weir is inaccessible in the closed chamber and manual adjustment thereof is both inconvenient and expensive. Alternatively, the use of automatic weir adjustment means would require internal mechanisms and positive sealing of the closed chamber and would result in a system which is expensive, mechanically complex and difficult to maintain without system shutdown.

Moreover, it is frequently difficult to accommodate a weir within the confines of the chamber which is sufficiently long and extended to minimize the effects of variations in hydraulic loads. Operationally, the use of an internal weir introduces an additional hydraulic loss which would not otherwise be present and which must be accomodated by provision of additional pumps or pumping capacity in the treatment system.

In connection with the above, it is often desirable to adjust the submergence of the surface aerator device within fairly narrow limits to vary the level of gas-liquid contacting and power input to the aerator, as for example in response to cyclic changes in the oxygen demand of the liquid undergoing treatment. A fixed position internal weir cannot accomodate a wide range of oxygen requirements in the liquid undergoing treatment and maintain an optimium submergence and aerator power input under all conditions. With a fixed position internal weir, the power input to the aerator may be varied by changing the speed of rotation of the aerator, but this requires variable speed drive mechanisms which are expensive to provide and maintain and which usually represent an added inefficiency in the power transmission system. The capability to reduce consumption during periods when oxygen demand is low is important for economy and for energy conservation in the oxygenation system. Similarly, the ability to increase power input therein to meet cyclically- or seasonally-high oxygen demand is important in order to avoid inadequate treatment of wastewater and consequent pollution of receiving waters.

Another important disadvantage associated with the inflexibility of the fixed internal weir is the difficulty in accomodating permanent, progressive increases in liquid flow rate. It is common practice to overdesign a treatment plant in deference to anticipated long-range load increases. For example, a plant may go onstream at half its design capacity, with the full (design) load not expected until a number of years later. Under such conditions, it is often desirable to operate the water treatment facility at a considerably lower oxygen dissolution capability than the ultimate plant load will require. Such provision makes it necessary to operate initially at a lower aerator submergence which is compatable with the relatively low initial dissolution capability and later at an increased aerator submergence for higher dissolution capability. As through put increases, a plant with internal weirs must be periodically modified, either to reposition weirs and/or to adjust the elevation of the surface aeration devices. Such changes are expensive, time-consuming and require shutdown of the facility.

Accordingly, it is an object of the present invention to control liquid level in an enclosed chamber contacting system employing surface aeration in such manner as to continuously minimize liquid fluctuations which would deleteriously affect the surface aeration apparatus.

It is a further object of the invention to control gas space pressure level in an enclosed chamber contacting system employing surface aeration in such manner as to continuously minimize liquid level fluctuations and to limit the aeration power expenditure.

It is a still further object of the invention to provide means for controlling submergence of surface aeration apparatus in enclosed covered aeration zones which are readily adjusted to accommodate changes in both the oxygen requirement of the liquid undergoing treatment and in the hydraulic loading of the aeration zone.

Other objects and advantages of this invention will be apparent from the ensuing disclosure and appended claims.

SUMMARY

This invention relates to method of and apparatus for controlling liquid level and power consumption in liquid treatment systems wherein surface aeration devices are employed in closed chambers for gas/liquid contacting.

The method aspect of the invention relates to a process for continuously contacting gas and liquid by the steps of separately flowing feed liquid and feed gas at superatmospheric pressure into an enclosed covered contacting zone containing a body of liquid and a body of gas thereabove, mixing the liquid and gas and simultaneously continuously recirculating the liquid by projecting it into the overlying gas to effect surface aeration contacting of the liquid in the zone, discharging contacted gas from the zone and separately discharging contacted liquid from the zone through a submerged discharge opening, wherein the following control steps are conducted:

(a) sensing the power consumed for mixing and recirculation in the surface aeration contacting step;

(b) converting the power consumption sensing into a transmittable signal; and (c) adjusting the flow rate of gas passed through the contacting zone by means of the transmitted power consumption signal, thereby adjusting the liquid level in the contacting zone by change in the gas pressure therein from adjustment of the gas flow rate to maintain a predetermined power consumption.

The apparatus aspect of the invention relates to a system for controlled contacting of gas and liquid comprising a liquid storage enclosure, with a gas-liquid contacting chamber within the storage enclosure having walls extending substantially to the floor of the enclosure and also extending upwardly above the liquid level, and a cover over the upper ends of the walls to form a gas space overlying the liquid. Conduit means are provided for introducing feed liquid to the chamber, along with conduit means for introducing feed gas at superatmospheric pressure to the chamber. Surface aeration means are positioned within the chamber for mixing and continuous recirculation of the liquid against the gas. The apparatus also includes gas vent conduit means for discharging contacted gas from the chamber, flow control means for regulating the flow rate of gas passed through the chamber, and liquid discharge passage means having an inlet positioned for submergence in the liquid in the chamber for discharging gas-contacted liquid from the chamber. Further control means are provided, comprising: means for sensing the power consumption of the surface aeration means; and means for transmitting signals from the power consumption sensing means to the flow control means for adjustment of the flow rate of gas passed through the chamber in response to the sensed power consumption, whereby liquid level in the chamber is adjusted by change in gas pressure therein from adjustment of the gas flow rate to maintain a predetermined power consumption.

In a particularly preferred aspect, the method and apparatus of the invention are suitably employed to control submergence of surface aeration apparatus in oxygenation wastewater treatment systems of the type as described hereinearlier and disclosed and claimed in McWhirter et al U.S. Pat. Nos. 3,547,812–3,547,815, incorporated herein to the extent pertinent. The invention permits continuous limitation of expended gas-liquid contacting power in a very simple way, and eliminates undesired variations in system performance due to the sensitivity of surface aeration devices in closed contacting zones to modest liquid level changes.

DESCRIPTION OF THE PREFERRED EMBODIMENTS

Figure 1:
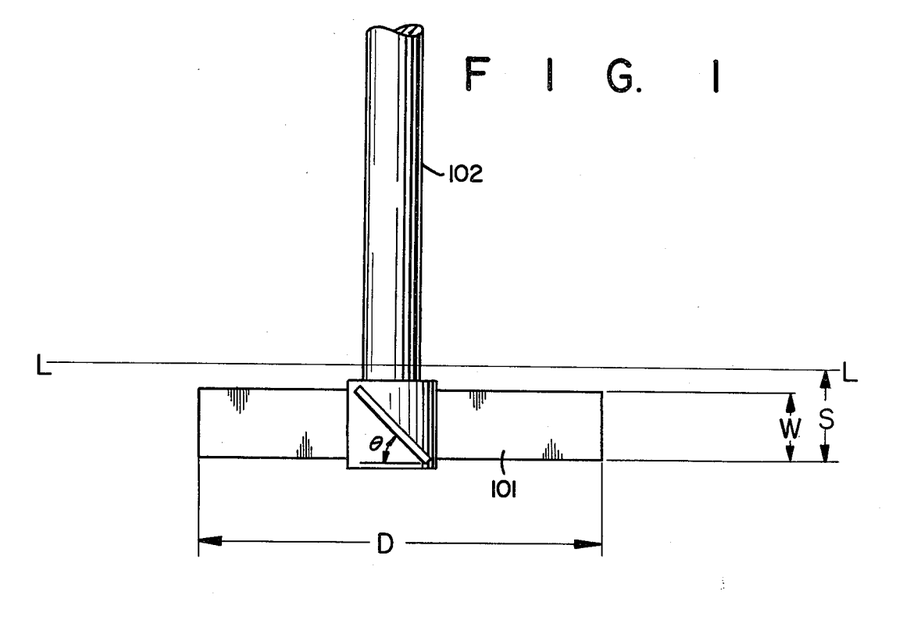
FIG. 1 is an elevational view of an illustrative rotatable impeller surface aeration device.

Referring now to the drawings, FIG. 1 shows an illustrative surface aeration device of a type which is particularly preferred in the practice of the present invention. This apparatus features four pitched planar turbine blades 101 which are disposed at a angle $\theta$ with respect to the horizontal plane containing the bottom edges of the impeller blades. The pitched blades are mounted on the vertical shaft 102 for rotation by suitable drive means (not shown). The tip-to-tip diameter of the surface aerator is shown as dimension D in the drawing, while dimension W is the projected blade width in a plane parallel to both the longitudinal centerline of the blade and the axis of shaft 102. In quantitatively expressing the position of the surface aerator, the static liquid submergence S is measured from the lower edge of the aerator blade 101 to the static liquid surface L—L. As used herein the terms "static liquid level" and "static liquid submergence" are based on the position of the gas-liquid interface under static, i.e., quiescent and non-aerated, conditions.

In connection with the foregoing nomenclature, a relative static submergence for the rotating impeller surface aeration of FIG. 1 is defined as follows:

$$S/W=0$$

Impeller clear of liquid.

$$0<S/W<1.0$$

Impeller operating with partial blade exposure.

$$S/W=1.0$$

Impeller fully submerged; static liquid level even with upper edge of blades.

$$S/W>1.0$$

Static liquid level above top edge of blade.

For effective performance, the rotating impeller is typically disposed in a fully submerged position with a relative static submergence $S/W=1.0$ and rotation is such that the impeller blades are pitched in the forward direction with respect to the direction of rotation. Such forward pitch imparts a "pushing" action to the liquid undergoing treatment.

In operation, liquid at low dissolved gas concentration is drawn into the impeller and subsequently discharged radially in the form of both a liquid 'throw' or umbrella and a relatively high velocity surface liquid layer. The umbrella of projected liquid provides the major portion of the gas/liquid contact area required for mass transfer. Some additional contacting is achieved through general turbulence of the liquid surface and gas bubble entrainment in the region where the projected liquid impinges on the aerated liquid surface and reenters the bulk liquid volume. The aerated liquid, at substantially higher dissolved gas concentration, is then mixed and circulated throughout the contact zone. Both the gas dissolution and the liquid mixing are sustained by the hydraulic action of the surface impeller.

In oxygenation wastewater treatment systems of the type as described hereinearlier, and disclosed and claimed in the aforementioned McWhirter patents, a large interfacial area between gas and liquor is employed to promote rapid dissolution of the oxygen gas. However, this area must be produced in a manner which avoids a close approach to oxygen saturation in the liquid bounding the interfacial area. This is accomplished by producing the interfacial area in a large volume of liquor so that not more than a thin film of liquor at the interface will be near saturation, and so that the dissolved oxygen (D.O.) gradient from the interface to the bulk liquor will be high. For such applications, the surface aeration device shown in FIG. 1, which projects relatively massive spouts or sheets of liquid into the gas, is highly satisfactory in achieving the desired gas-liquid contact. Other types of surface aeration devices which project a liquid spray into the gas are preferably avoided in the oxygenation system because a droplet possesses a large surface area and a small volume of liquid, although such droplet generation devices may suitably be employed in accordance with the broad practice of the present invention.

Figure 2:
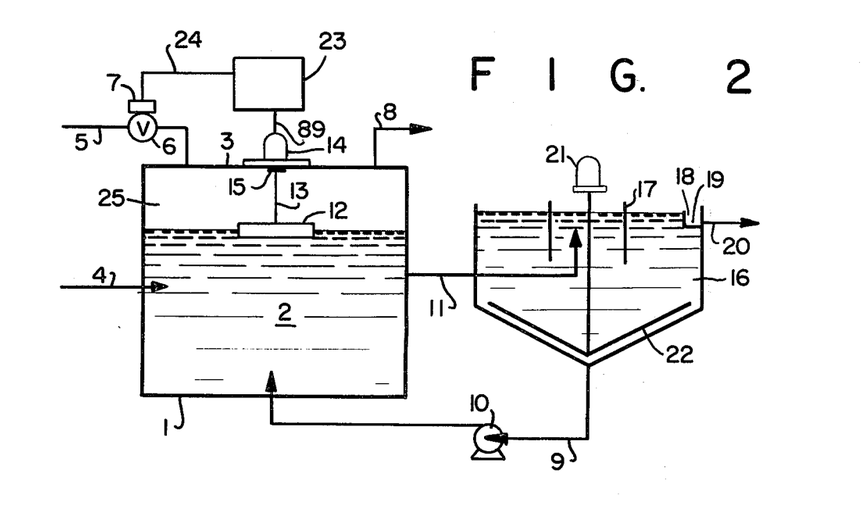
FIG. 2 is a schematic view taken in cross-sectional elevation of an oxygenation apparatus according to one embodiment of the invention with a rotatable impeller surface aerator and feed gas flow control means.

FIG. 2 shows an oxygenation system according to one embodiment of the present invention, wherein a surface aeration device of the type shown in FIG. 1 is employed in the single oxygenation chamber 2 formed by liquid storage enclosure 1. BOD-containing feed water, as for example municipal sewage, enters chamber 2 through conduit 4. A conduit 5, having flow control means comprising control valve 6 and valve actuator/controller 7 therein, is provided for flow of oxygen-enriched feed gas, as for example at least 50% oxygen, into chamber 2. The latter is provided with gas tight cover 3 to isolate from the atmosphere an oxygen-enriched aeration environment in the gas space 25 over the liquor. Recycle activated sludge is also introduced to chamber 2 by means of conduit 9 and recycle sludge pump 10, although the BOD-containing feed water and recycle sludge may be mixed prior to introduction in the chamber if desired.

The aforementioned streams are intimately mixed in the chamber 2 contacting zone to form liquor having a high volatile suspended solids content (MLVSS), as for example greater than 3000 p.p.m. A surface aeration means comprising rotatable impeller 12 positioned at the surface of the liquor is provided within chamber 2 for mixing the liquor and gas and simultaneously continuously recirculating the liquor by projecting it into the overlying oxygen-enriched atmosphere in the gas space 25. The rotatable impeller 12 is driven by motor 14 by means of the shaft 13 passing through seal 15 in the cover 3.

During aeration, the aerobic organisms in the activated sludge adsorb and assimilate the biochemically oxidizable organic material (BOD) of the wastewater, thereby converting the organic material to forms which can be separated readily from the purified water. Simultaneously, inert gases such as nitrogen entering with the BOD-containing water and with the oxygen-rich feed gas, and gases such as $CO_2$ produced in the biochemical reaction are evolved and collected with unconsumed oxygen in the gas space 25. Oxygen-depleted or spent oxygenation gas is discharged from the chamber 2 contacting zone through gas vent conduit 8. The rates of oxygen-enriched feed gas introduction and oxygen-depleted gas discharge are preferably set to provide an oxygen partial pressure of at least 380 mm Hg in the aeration atmosphere of gas space 25.

At the end of the aeration step of 20 to 180 minutes duration, oxygenated liquor is discharged from chamber 2 through liquid discharge means comprising conduit 11. The inlet of conduit 11 is submerged in the liquid in chamber 2 and the conduit passes externally from the chamber in closed flow relationship into the clarifier 16. In the clarifier, the terminal portion of conduit 11 extends upwardly above the elevation of the submerged conduit inlet to a terminal end outlet disposed within concentric baffle 17. The baffle serves to form a stilling well for the oxygenated liquor introduced to the clarifier by the conduit and preferably extends from above the liquid level in the clarifier to a point intermediate this level and the clarifier's conical bottom. In the clarifier the oxygenated liquor is separated by the settling out of activated sludge solids. Motor 21 drives a slowly rotating rake 22 across the clarifier bottom to prevent "coning" of the dense settled sludge. In the clarifier, a solids-depleted purified supernatent liquid is formed which rises in the clarifier to the liquid-air interface and overflows weir 18 into trough 19 for discharge through conduit 20. The settled sludge is withdrawn through conduit 9 and at least a portion thereof is pressurized by pump 10 for recycle to chamber 2 for inoculation of the incoming BOD-containing water. Any sludge not needed for recirculation may be removed from the system upstream of the pump 10 in a manner well known to those skilled in the art. Under the aforementioned process conditions of mixed liquor solids concentration and gas space oxygen partial pressure, the volume ratio of recycling active sludge/BOD-containing water is maintained in the range of 0.1 to 0.5. This ratio may be maintained by varying the speed of pump 10.

During the liquid treatment process described above, the power consumption of surface aerator 12 is continuously sensed by load (power draw) sensing means comprising load signal transmitting means 89 and power transducer 23. In practice, the aerator drive means 14 is most commonly an electric motor so that the load sensing means may suitably comprise a watt transducer adapted to monitor the power (wattage) draw of the motor. It is to be understood that the coupling shown in FIG. 2 between the power transducer 23 and drive means 14 is intended to be illustrative only in showing a general connective relationship between the respective system elements, and that the arrangement whereby means are disposed to sense the power consumption of the surface aeration device may be suitably effected in any manner well known to those skilled in the art. For example, a three-phase wire line (not shown) may be employed to provide power to the three-phase motor drive means 14. The wattage-sensing transducer 23 may then comprise a transducer amplifier and current and potential transformers which are coupled to the three wire line supplying power to motor 14 by load signal transmitting means 89. In response to variable load conditions, the signals transmitted by load signal means 89 are passed through the respective transformers and converted by the transducer amplifier into a variable output signal which is then transmitted by signal transmitting means 24 to the feed gas supply valve controller 7. The signal from transducer 23 may be a direct current signal and the feed gas supply valve 6 may be a pneumatic valve, whereby controller 7 may be of the electropneumatic actuator type. Alternatively, controller 7 may be an electric motor actuator, and may thus be directly mechanically linked to valve 6. In either type of system, the current signal from transducer 23 is employed to open or close the control valve 6 to the desired extent in response to process conditions.

In operation, the set point on valve controller 7 is at the transducer signal corresponding to the desired aerator horsepower draw under normal process conditions. When the liquid level in chamber 2 drops from the normal level due either to increase in gas space pressure or to reduction in hydraulic flow, the submergence of the rotating impeller will be reduced and the power consumption of the aerator will correspondingly decrease. The transducer output signal transmitted by means 24 to controller/actuator 7 will then cause the feed gas supply valve 6 to partially close to an extent proportional to the change in signal strength. This partial closing of the supply valve reduces the feed gas flow rate and the aeration gas pressure in the gas space 25 so that the rate of liquid discharge through conduit 11 decreases and the liquid level in chamber 2 rises to the level where the sensed power draw is again equal to the power consumption under normal process conditions. Alternatively, if the liquid level in chamber 2 increases due either to decrease in the gas space pressure or to increase in the influent liquid flow rate, the submergence and power consumption of the surface aeration device will correspondingly increase. The increased power consumption sensing will in turn cause the transducer output signal to change so as to open the feed gas supply valve via controller/actuator 7. The supply valve opens up, increasing the feed gas flow rate and the pressure of the aeration gas in gas space 25 so that the liquid level in chamber 2 decreases to the level where the sensed power draw is again equal to the power consumption under normal process conditions. In this manner the feed gas flow rate is continuously regulated in response to the sensed power consumption to adjust the liquid level in the oxygenation chambers, by change in the gas pressure therein resulting from the adjustment of the gas flow rate, so as to maintain a predetermined power consumption level under all conditions.

As described hereinabove, oxygenated liquid is discharged from the oxygenation chamber 2 and introduced into the clarifier 16 by means of conduit 11. Since the clarifier is open to the atmosphere and there is closed liquid flow communication between chamber 2 and the clarifier, the liquid level in the oxygenation chamber will be 'balanced' against the liquid level in the clarifier. For example, if there is no loss of liquid head across conduit 11 in the FIG. 2 system, the liquid level in the clarifier will be higher than the liquid level in the oxygenation chamber by a height differential equivalent to the gauge pressure of the aeration gas in gas space 25. Such "manometric" liquid discharge arrangement is preferred in the practice of the invention because it facilitates particularly rapid adjustment of the liquid level in chamber 2 in response to change in the aeration gas flow rate. In terms of the present invention, the manometric discharge arrangement requires an enclosed liquid flow passage, at least a part of which extends substantially upwardly above the elevation of the discharge means inlet which is submerged in the gas-liquid contacting chamber, together with a passage outlet having weir means positioned proximate thereto for final atmospheric pressure overflow discharge of the gas-contacted liquid which is flowed through the enclosed liquid flow passage. With reference to the FIG. 2 embodiment of the invention, the enclosed passage outlet is the terminal end of conduit 11 and weir 18 is proximately located with respect thereto, being adjacent the upper segment of the outer clarifier wall. Thus, the oxygenated liquor introduced into the clarifier is flowed upwardly into the baffled inlet region of the clarifier bounded by wall 17, while the liquid flowing out of the inlet region rises against a hydrodynamic liquid head to the liquid-air interface for final discharge over weir 18.

The above described manometric arrangement has a further advantage in that it tends to protect the surface aeration device from too shallow an impeller submergence under conditions of suddenly reduced influent liquid flow rate. Although the transducer control circuit will respond quickly to restore liquid level to the normal condition level, there will be some finite lag time in the response. During such lag time, the liquid levels in the oxygenation chamber and the clarifier will tend to equalize and thus prevent an "overhung" or shallow submergence condition which can under repeated occurrence severely shorten mechanical equipment life. Further protection against extreme submergence levels during the short lag time may be provided by pressure relief and vacuum breaker valves (not shown) suitably positioned in the cover of the oxygenation chamber, although the restricted gas vent conduit 8 is preferably sized to provide adequate rates of gas flow under all conditions while maintaining suitable back pressure in the gas space 25 for control purposes.

As a necessary feature of the present invention, the liquid discharge means must have an inlet positioned for submergence in the liquid in the gas-liquid contacting chamber. With reference to the position of the surface aeration means disposed in the contacting chamber, it is generally desirable to position the liquid discharge means inlet at least beneath the uppermost submergible point or elevational level on the surface aerator in order to insure that the aeration gas is retained in the gas space of the contacting chamber for the proper length of time and not 'wasted' from the contacting chamber through the liquid discharge means, such as might occur during short-term liquid level fluctuations in the chamber. As applied to the FIG. 2 system, the above considerations indicate that the inlet of conduit 11 should be located at an elevation below that of the upper edge of surface aerator blade 12. In practice, it is apparent that the size and dimensions of the system shown in FIG. 2 may vary with specific applications and that the specific dimensions of the surface aeration device therein will vary with the dimensions of the oxygenation chamber and gas/liquor contacting requirements. However, by way of example, an oxygenation chamber 18 feet square and 9 feet deep may employ a pitched blade turbine surface aeration device such as shown in FIG. 1, having four blades with an angle of pitch $\theta$ equal to 45°, a tip-to-tip impeller diameter D of 44 inches, a projected blade width W of 7 inches, and a relative submergence S/W of 1.0, for the desired mass transfer and mixing performance. The importance of the present invention may be shown by the following example based on this illustrative oxygenation chamber. In practice, the recommended operating submergence range for 45° pitched blade turbine rotating impellers, based on observations of hydraulic stability, is $0.75 \leq S/W \leq 1.5$, where S/W is the corresponding relative static submergence previously defined. Operation with relative static submergence values outside of these limits will often result in the aberrant hydraulic phenomona discussed hereinearlier, e.g., wave motion at the liquid surface, severe power surging, etc. Nonetheless, in the absence of any associated liquid level controlling means, it may be possible to experience liquid level changes of from 4 to 6 inches in this illustrative oxygenation chamber, as for example due to pumping cycles and/or variation in hydraulic loading (influent liquid flow rate). With such variation in liquid level in the oxygenation chamber, there is a corresponding substantial change in the power draw of the surface aeration device. Table 1 below lists several illustrative values for relative static submergence S/W and power ratio of the pitched blade turbine aerator in the illustrative oxygenation chamber. The power ratio in the Table is the ratio of the total shaft horsepower consumption of the aerator at the given relative static submergence to the total shaft horsepower consumption of the aerator at a relative static submergence S/W of 1.0 (design liquid level). The power ratio values in the Table are based on power consumption measurements made under operating conditions, and the tabulated liquid level and submergence values are the measured static values which correspond to these operating conditions.

TABLE 1

| Static Liquid Level | Relative Static Submergence, S/W | Power Ratio |
|---|---|---|
| 3" below design | 0.57 | 0.77 |
| Design level | 1.00 | 1.0 |
| 4" above design | 1.57 | 1.25 |

As shown by the values in Table 1, the power consumption resulting from a 4 inch increase in submergence of the aerator in the oxygenation chamber is 25% greater than the power requirement at design conditions. Overall, there is a 62% increase in power draw from the shallow submergence at 3 inches below design liquid level to the deep submergence at 4 inches above design liquid level, in this uncontrolled system. In a system controlled by the means of the instant invention, the liquid surface in the oxygenation chamber is continuously maintained at the design liquid level, thereby providing the degree of control necessary to avoid instability, overload and surging, and to continuously limit power consumption at the predetermined level.

Figure 3:
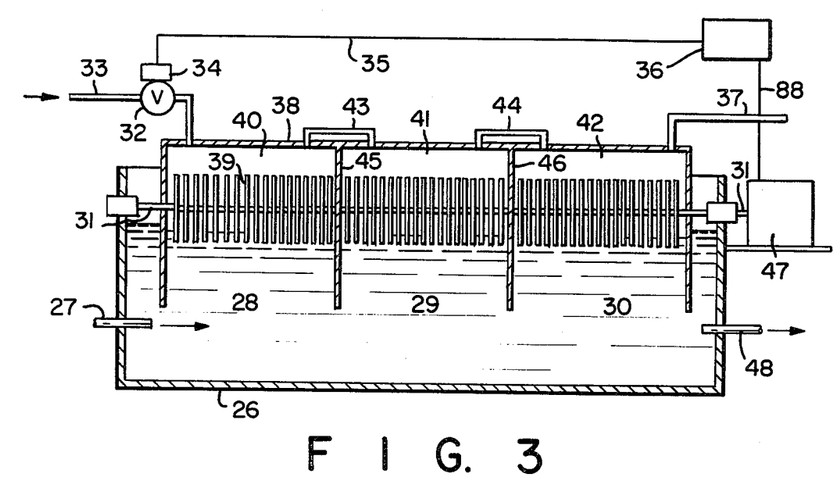
FIG. 3 is a schematic view taken in cross-sectional elevation of another oxygenation system embodiment of the invention with three oxygenation chambers and a brush type surface aeration means.

FIG. 3 shows another oxygenation system embodiment of the invention featuring three oxygenation chambers and a brush type surface aeration device. The treatment system of FIG. 3 is of a preferred type as disclosed and claimed in U.S. Pat. No. 3,547,815, "Staged Oxygenation of BOD-Containing Water", issued Dec. 15, 1970 in the name of John R. McWhirter and incorporated herein to the extent pertinent, wherein at least two covered oxygenation chambers are provided through which liquid and gas phases flow concurrently. In such systems feed wastewater, recycled sludge and oxygen gas are introduced into the first chamber. The successive chambers are connected to each other in a manner which allows gas to flow freely from chamber to chamber with only a very slight pressure drop, sufficient to prevent gas backmixing or interchamber mixing of the aeration gas. The liquid flow (mixed-liquor) through successive stages is preferably cocurrent with the gas flow. Such provision of cocurrent oxygen-enriched aeration gas and mixed liquor flow through a multichamber contacting system tends to yield a naturally tapered oxygenation system with respect to the oxygen availability in the gas and to the oxygen demand of the mixed liquor, thereby causing the gas-liquid contacting power requirements to be more equal throughout the system, while extremely high levels of oxygen absorption efficiency, e.g., 90—95%, may be simultaneously achieved.

In the FIG. 3 system, a BOD-containing water storage enclosure 26 is provided having inlet conduit 27, for introducing BOD-containing feed water and activated sludge to the first oxygenation chamber, and outlet conduit 48, for discharging finally-oxygenated water extending through the respective end walls thereof. Three separate oxygenation chambers 28, 29 and 30 are provided in enclosure 26, each having walls extending substantially to the floor of the enclosure, including partition wall 45 between chambers 28 and 29 and partition wall 46 between chambers 29 and 30. The chamber walls extend above the BOD-containing liquid and a common cover 38 is provided over their upper ends to form gas spaces 40, 41 and 42 in the respective chambers 28, 29 and 30. An inlet gas conduit 33 is provided for introducing oxygen-containing feed gas to the first oxygenation chamber 28, along with flow control means comprising valve 32 and valve actuator/controller 34 in the conduit. Unconsumed oxygen-containing gas flows from first chamber 28 to second chamber 29 through restricted conduit 43, and from the latter to third chamber 30 through restricted conduit 44. These conduits may be sized to provide only sufficient cross-sectional area for the desired flow, or alternatively may be provided with restricted flow means as for example an orifice in the cross-section. Oxygenated water is transferred from chamber to chamber by flow through the passage areas bounded by the enclosure floor and the lower ends of partition walls 45 and 46. Oxygen-depleted aeration gas is discharged from third oxygenation chamber 30 through the gas vent conduit 37.

The surface aeration device in the FIG. 3 system comprises a brush-type construction with horizontal shaft 31 extending the length of the adjoining oxygenation chambers and through the end walls of the storage enclosure 10. Multiple radial spines in circumferential arrays 39 are axially spaced along the shaft and positioned to partially dip into the liquor. On rotation of shaft 31 by motor drive means 47 the radial spine arrays project liquor into the gas space of each chamber and cause liquor to circulate within the chambers. In this manner effective contact surfaces are created and the liquor and gas are intimately mixed.

In the treatment process carried out in the FIG. 3 system, BOD-containing water and activated sludge enter the treatment system through conduit 27 and are mixed in chamber 28 as first liquor with feed gas as for example at least 50% oxygen introduced through feed gas conduit 33 at a pressure of about 1–4 inches of water column gauge, with simultaneous continuous recirculation of the liquor against the gas in gas space 40, to form a first oxygenated liquor and first unconsumed oxygen-containing gas. In preferred practice, the first oxygenated liquor has a volatile suspended solids content of at least 3000 p.p.m. and the first unconsumed oxygen-containing liquor is discharged from the first chamber 28 and flows through the passage area bounded by the enclosure floor and the lower end of partition wall 45 and into the second chamber 29, while the first unconsumed oxygen-containing gas is discharged from the first chamber and introduced to the gas space 41 of the second chamber by means of restricted conduit 43. In the second chamber the discharged first unconsumed oxygen-containing gas is mixed with the discharged first oxygenated liquor and simultaneously the first oxygenated liquor is continuously recirculated against the first unconsumed gas in gas space 41 to form a second unconsumed oxygen-containing gas of lower oxygen purity than the first unconsumed gas and a second oxygenated liquor. The second gas and second liquor are then discharged into the third and final oxygenation chamber for mixing and recirculation therein to form finally oxygenated liquor and oxygen-depleted gas, which are subsequently discharged from the treatment system by liquid discharge conduit 48 and gas vent conduit 37, respectively. The liquid discharge conduit 48 may be coupled in flow communication with a clarifier downstream of the oxygenation treatment zone in the same manner as shown in FIG. 2 for the single chamber oxygenation system.

The FIG. 3 embodiment also employs a manometric liquid level feature, with the liquid level in the transverse spaces between the vertical end walls of liquid storage enclosure 26 and the respective adjacent end walls of the first and last oxygenation chambers being generally higher than the liquid level in the adjoining chambers, by virtue of the superatmospheric aeration gas pressure in gas spaces 40, 41 and 42. In practice, the gas phase pressure drop across the restricted passageway means between consecutive chambers is typically on the order of 1/16 to ⅛ inch of water column, this being sufficient to prevent significant backmixing of gas between chambers, and the liquid level in the respective oxygenation chambers is essentially constant. As discussed hereinearlier, the above manometric feature is preferred from a control standpoint since it facilitates rapid system response, both to changes in hydraulic loading and to changes in the gas feed rate.

In the above embodiment each chamber produces oxygenated liquor of lower food content (BOD) than the immediately preceding chamber and the oxygen purity of the unconsumed gas discharged therefrom is lower than that of the oxygen-containing gas introduced for mixing, and preferably at least 60% (by volume) of the oxygen in the feed gas is consumed in the liquor of all stages. Also in this embodiment the retention period of a quantity of gas in each stage is long compared to the time the gas is in transmit from one stage to another, as for example a time ratio of at least 30.

During the above described liquid treatment process, the liquid level in the oxygenation chambers is continuously adjusted by change in gas space pressure therein resulting from adjustment of the feed gas flow rate by means of a control system similar to that previously described in connection with FIG. 2 herein. The power consumption of the surface aeration device is sensed by load sensing means comprising load signal transmitting means 88 coupled with the motor drive means 47 in the previously described manner and power transducer 36. The transducer 36 is adapted to convert the power consumption sensing into a transmittable control signal which is then transmitted by signal transmitting means 35 to the feed gas supply valve actuator/controller 34. By such arrangement, the feed gas supply valve 32 is opened or closed to a greater or lesser degree in response to the strength of the control signal to adjust the flow rate of the oxygen-containing feed gas to the first oxygenation chamber, thereby adjusting the liquid level in the oxygenation chambers by the feed gas flow rate to maintain a predetermined power consumption level.

Figure 4:
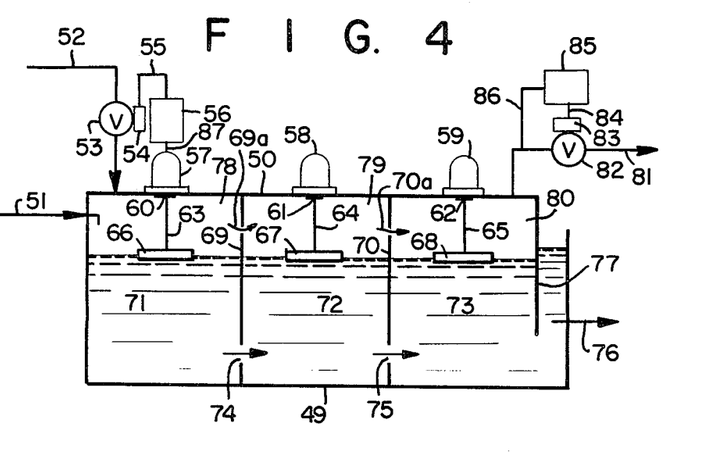
FIG. 4 is a schematic view taken in cross-sectional elevation of another three-chamber oxygenation system embodiment characterized by rotatable impeller surface aeration means and control means for maintaining a predetermined oxygen concentration in the vent gas discharged from the terminal oxygenation chamber.

FIG. 4 shows another oxygenation system embodiment wherein the liquid enclosure 49 contains three oxygenation chambers 71, 72 and 73, with partition walls 69 and 70 between the first and second and the second and third chambers, respectively, and a cover 50 over the upper ends of the chamber walls to form the gas spaces 78, 79 and 80. BOD-containing feed water enters the first oxygenation chamber 71 through conduit 51. Conduit 52, having flow control means comprising control valve 53 and valve actuator/controller 54 therein, is provided for flow of oxygen enriched feed gas into chamber 71. Surface aeration means comprising rotatable impellers 66, 67 and 68 positioned at the surface of the liquor are provided within the respective chambers 71, 72 and 73 for mixing and continuous recirculation of the liquor against the oxygen-enriched atmospheres in the respective gas spaces 78, 79 and 80. The rotatable impellers 66, 67 and 68 are driven by the corresponding motors 57, 58 and 59 by means of shafts 63, 64 and 65 passing through seals 60, 61, 62 in the cover 50.

The partition walls 69, 70 in the FIG. 4 system extend from the floor of enclosure 49 up to the cover 50 overlying the oxygenation chambers and are provided with restricted openings for flow of gas and liquor from chamber to chamber. Restricted opening 74 provides flow of partially oxygenated liquor from first chamber 71 to second chamber 72 and restricted opening 75 provides flow of further oxygenated liquor from second chamber 72 to third chamber 73. The FIG. 4 apparatus provides a close approach to true plug flow of liquor, with the liquor velocity through restricted openings 74 and 75 sufficient to prevent backmixing. The liquor in each chamber is substantially uniform in composition and the BOD content progressively declines from the liquor feed stage 71 to the liquor discharge stage 73. Finally-oxygenated liquor is discharged from the terminal oxygenation chamber through the submerged opening bounded by the floor of the enclosure 49 and the lower end of final oxygenation chamber wall 77 and flows upwardly above the elevation of the inlet opening against a hydrodynamic liquid head in the enclosed liquid flow passage formed by the oxygenation chamber wall 77 and the end-wall of the liquid storage enclosure 49 transversely spaced from and substantially parallel to wall 77. As shown in FIG. 4, a liquid discharge conduit 76 is disposed with its inlet in the enclosed liquid flow passage above the inlet opening to the flow passage and its terminal outlet end external of the storage enclosure 49. As an alternative oxygenated liquid discharge arrangement in the system shown in FIG. 4, liquid discharge conduit 76 could be eliminated so that an outlet to the enclosed liquid flow passage would be formed by the liquid enclosure end wall transversely spaced from and shorter in height than chamber wall 77. In this alternative arrangement, liquid would rise in the enclosed passage against the hydrodynamic liquid head and would overflow over the upper end of the enclosure wall so that the latter would function as a weir means, with a liquid-air interface being formed at the passage outlet. This alternative type of arrangement may for example be useful in certain types of integrated plants wherein a clarification zone is contiguously positioned with respect to the oxygenation zone tankage such that the liquid enclosure end wall forms a common partition between the respective treatment zones.

The FIG. 4 apparatus differs from that shown in FIG. 3 in the provision of flow restricting openings in the upper portions of the interchamber partitions above the liquor level in the chambers. Oxygen depleted gas from the first chamber 71 flows through opening 69a into second chamber 72 as the aeration gas therefor, and with sufficient pressure differential to prevent backmixing. In the second chamber 72 additional oxygen of the aeration gas is consumed by dissolution and bio-oxidation in the partially oxygenated liquor, and additional gases evolve into the aeration gas from the liquor. Further oxygen-depleted gas flows through the restricted opening 70a into third chamber 73 for mixing therein with further oxygenated liquor. The third chamber 73 operates in the same manner as second chamber 72, and aeration gas of lowest oxygen content and highest inerts content is vented from the third chamber through conduit 81 at restricted rate by means of the associated control apparatus to be described more fully hereinafter.

The rotating impeller surface aeration devices positioned in the oxygenation chambers in the FIG. 4 embodiment may suitably comprise pitched blade impellers of the type previously described in connection with FIG. 1 herein. Regardless of the type of device employed, however, the surface aerators in this, as in all oxygenation system embodiments of the invention, should have a standard air transfer efficiency (STE) of at least 1.5 and preferably 2.5 lb. oxygen/HP-hr. Aerating devices are commonly rated by the standard air transfer efficiency which identifies the capability of the device to dissolve oxygen from air into zero-dissolved oxygen tap water at one atmosphere pressure and 20° C. The above efficiency levels are necessary to use the energy supplied to the aeration zone efficiently to generate the requisite gas-liquor interfacial area for mass transfer.

The control system in the FIG. 4 embodiment comprises two separate control units respectively associated with feed gas conduit 52 and vent gas conduit 81. The feed gas conduit control unit comprises transducer 56, signal transmitting means 55 between the transducer and the actuator/controller 54 of feed gas supply valve 53, and load signal transmitting means 87 coupled to the transducer for transmitting signals based on the power consumption of drive means 57. This control unit operates in the same manner as previously described in connection with FIGS. 2 and 3, by adjusting the feed gas flow rate in response to the sensed power consumption, whereby the liquid level in the chambers is adjusted by the change in pressure resulting from the adjustment of the feed gas flow rate to maintain a predetermined power consumption. Although the transducer is shown as being illustratively coupled with the motor drive means 57 of chamber 71, it is to be understood that the feed gas conduit control unit is not necessarily restricted to such arrangement. For example, the load signal transmitting means 87 could be suitably connected to transmit signals based on the power consumption of either motor drive means 58 of chamber 72 or motor drive means 59 of chamber 73 to the transducer 56. Alternatively, the load signal transmitting means may be adapted to simultaneously couple the transducer with two or more individual motor drive means on different chambers. Nonetheless, in the presently described oxygenation systems, only one coupling is required, preferably with the motor drive means for the first oxygenation chamber. The first chamber location is preferred in practice because it provides the closest proximity to the points of gas and liquid introduction into the system, thereby facilitating the fastest control system response, relative to the other chamber locations.

In addition to its inherently stable and self-regulating nature under conditions of changing influent liquid flow rate, the feed gas conduit control system of FIGS. 2–4 also tends to perform optimally under conditions when the strength of the influent liquid changes while the liquid feed rate remains constant. For example, an increase in gas pressure in the gas spaces of the oxygenation chambers under conditions of constant influent liquid flow rate generally indicates a reduced rate of gas uptake by the liquid. With such occurrence the liquid level in the oxygenation chambers is depressed by the rising gas pressure and the power draw of the surface aeration device being monitored falls below the consumption level corresponding to normal process conditions. In response to this lower sensed power draw, a signal is transmitted from the transducer to the feed gas valve actuator/controller to partially close the feed valve from its previous setting. With a lower feed gas flow rate, the pressure in the oxygenation chambers decreases and the liquid level therein rises until the power consumption of the monitored surface aeration device increases to the predetermined desired level. At this point the feed gas flow rate has been adjusted to a level consonant with the dissolution requirements of the liquid being treated.

In like manner, falling gas space pressures under constant hydraulic loading conditions are characteristically due to increased rates of gas uptake by the liquid. Such uptake tends to increase the surface aerator submergence by virtue of the decreasing gas pressure so that power consumption of the aerator is increased above the level corresponding to normal process conditions. The control system then acts to further open the feed gas supply valve and increase the flow of aeration gas into the system. The increased pressure due to the higher gas flow to the oxygenation chambers depresses the liquid level therein to the desired extent and supplies gas to the liquid in the needed quantity.

Despite the above described tendency of the feed gas conduit control unit to perform optimally under conditions of varying influent strength (BOD), conditions detrimental to treatment system performance can arise where the biodegradeability characteristics of the influent wastewater vary considerably even though the BOD level may remain relatively constant. Under conditions of varying biodegradeability characteristics, the fractional amount of the total BOD which is removed in a given oxygenation chamber of the liquid treatment system may undergo a corresponding variation. Even though the feed gas conduit control unit will adjust liquid level in the system by the feed gas flow rate to maintain a predetermined power consumption level, such variance in biodegradeability may result in insufficient amount of oxygen gas being supplied to the oxygenation system or conversely, in poor utilization of the oxygen gas that is supplied thereto. Thus, although the gas space pressures in the oxygenation system may suitably maintain the predetermined liquid level, the vent gas discharged from the system may be too rich or too lean in oxygen content to achieve efficient and economical overall performance. If the vent gas is too rich in oxygen, then the valuable aeration gas is being wasted, and if the oxygen content of the vent gas is too low, then an uneconomical amount of power may be expended or an inadequately treated liquid stream may be discharged from the system.

In the above described situation and in other instances where close control of oxygen utilization is necessary, the vent gas conduit control unit shown in FIG. 4 may be advantageously employed. As illustrated in the drawing, the gas vent conduit 81 is equipped with flow control means therein comprising control valve 82 and valve actuator/controller 83. Oxygen gas concentration in the vent gas is sensed by purity analyzer 85 which is in communication with the vent conduit by means of flow line 86. In practice analyzer 85 is preferably of a type whose sensing operation is based on the paramagnetic character of oxygen gas. The analyzer is connected by concentration signal transmitting means 84 to the vent gas valve actuator/controller 83. In operation a portion of the gas being vented from chamber 73 through vent conduit 81 enters the flow line 86, passes into analyzer 85 for sensing of its oxygen concentration and is discharged from the analyzer by means not shown in the drawing. In response to the sensed concentration, the analyzer transmits a signal proportional to the oxygen gas concentration by the signal transmitting means 84 to actuator/controller 83. The actuator/controller in turn partially opens or closes valve 82 to maintain a predetermined oxygen concentration level in the vent gas, commensurate with economic and efficient utilization of the oxygen in the aeration gas fed to the treatment system.

In practice of the FIG. 4 embodiment, the oxygen concentration sensed by analyzer 85 may for example be converted to a current (amperage) signal which is transmitted by signal wire 84 to valve controller 83. The valve controller may then suitably be of the electric motor type, so that the current signal from analyzer 85 is employed directly to open or close valve 82 to the desired extent in response to process conditions. In a particularly preferred practice of this embodiment of the invention, the feed gas to the oxygenation system comprises at least 90% oxygen gas by volume and the vent gas conduit control unit is adapted to maintain an oxygen concentration in the discharge gas of between 20% and 50% by volume.

In the control system of FIG. 4, the control units associated with feed gas conduit 52 and gas vent conduit 81 are independent in the sense that no electronic or mechanical communication exists between them. However, these units are linked by indirect feedback through aeration gas purity and pressure fluctuations. For example, if, at a given oxygen-containing feed gas flow rate, the gas vent conduit control unit opens valve 82 incrementally to raise the concentration of oxygen in the vent gas to a higher level, the gas space pressures in the oxygenation chambers will drop, liquid level therein will rise, the power draw of the monitored aerator in chamber 71 will increase, and the feed gas valve 53 will open proportionately to increase the feed gas flow rate and thereby restore liquid level, gas space pressure, and power consumption to their previous levels; simultaneously the desired effect on the oxygen concentration in the vent gas discharged from the system will be achieved. Overall, the control system of FIG. 4 provides responsive and stable modulation of both the aeration gas feed rate and the waste aeration gas venting rate, so that highly efficient and economic utilization of the aeration gas and continuation maintenance of the predetermined power consumption are concurrently realized under all process conditions.

Despite the aforedescribed characteristic of the feed gas conduit control unit to tend toward optimal behavior under conditions of changing wastewater strength and relatively constant hydraulic loading, i.e., by changing the flow rate of oxygen-containing aeration gas which is passed through the oxygenation system so as to maintain the gas space pressure, liquid level and power consumption at the "normal" condition levels, when comparatively large changes in either wastewater strength or influent flow rate or both occur, the feed conduit control unit may not be able to fully satisfy the oxygen demand of the liquid undergoing treatment, even if the vent conduit control unit of FIG. 4 is employed. In such systems it may be desirable to further automatically adjust the aeration feed gas valve in response to changes in the dissolved gas requirement of the liquid. For example, in cases where a large increase in dissolved gas requirement of the influent liquid is needed, it may be desirable to increase the submergence of the aerator in the liquid within narrow limits. Such increase in submergence will expend more dissolution power on the liquid for mass transfer and thereby increase the rate of gas to liquid transfer. Nevertheless, the power draw of the surface aeration device will increase significantly with increasing submergence, and close tolerance on the adjustment of the feed gas valve is necessary in order to maintain overall aeration efficiency (rate of mass transfer/aerator power expenditure) at a suitably high value for economic operation.

Figure 5:
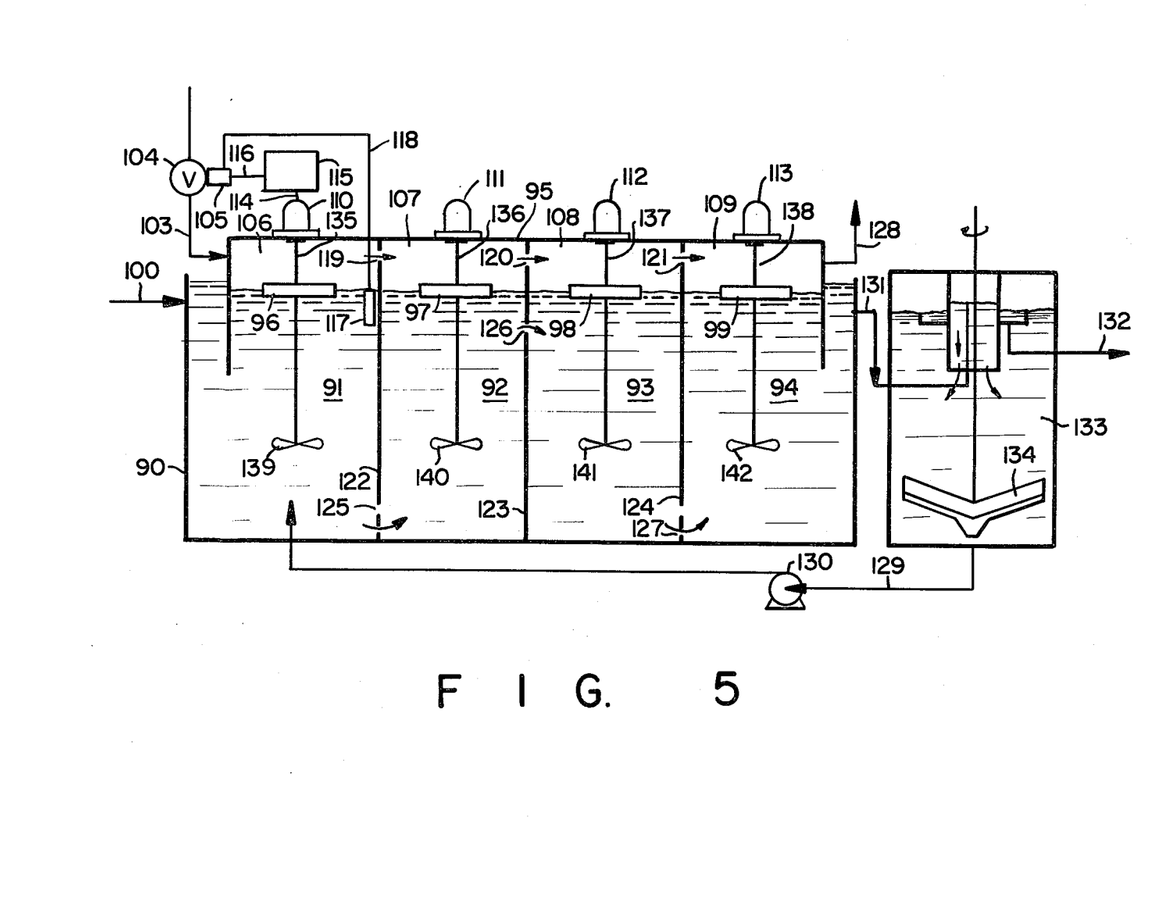
FIG. 5 is a schematic view taken in cross-sectional elevation of a further oxygenation system embodiment characterized by rotatable impellers positioned in each of four oxygenation chambers and control means for maintaining a predetermined dissolved oxygen concentration in the first oxygenation chamber.

FIG. 5 shows an illustrative embodiment of the instant invention having provision for further adjusting the feed gas flow rate in response to changes in the dissolved gas capacity of the liquid being treated. As shown in the drawing, a BOD-containing water enclosure 90 is provided having four oxygenation chambers 91, 92, 93 and 94 therein. The consecutive adjacent chambers are separated by partition walls 122, 123 and 124 which extend substantially from the floor of the enclosure to the common cover 95, positioned over the oxygenation chambers to form the consecutive gas spaces 106, 107, 108 and 109. The partition walls 122, 123 and 124 are provided with respective restricted gas flow openings 119, 120 and 121 in their upper portions above the liquid level, for flow of gas from chamber to chamber in the aforedescribed manner. Oxygenated liquor flow is provided by restricted flow opening 125 in the first-second chamber common partition wall 122 preferably near or beneath the bottom thereof, restricted opening 126 preferably in the upper portion of second-third chamber common partition wall 123 below the liquid level and restricted opening 127 preferably in the bottom portion of third-fourth chamber common partition wall 124. Such arrangement for cocurrent flow of gas and liquor affords a high bio-oxidation rate per unit volume of wastewater under treatment and high treatment efficiency for a given total oxygenation time.

In the FIG. 5 system oxygen-enriched feed gas is introduced to the first oxygenation chamber 91 by the feed gas conduit 103 having flow control means comprising feed gas valve 104 and valve actuator/controller 105 therein. Oxygen-depleted aeration gas from the terminal oxygenation chamber 94 is discharged from the system by means of restricted gas vent conduit 128. BOD-containing feed water, as for example municipal sewage, is introduced to the first oxygenation chamber by means of liquid conduit 100. The finally oxygenated liquor discharged from the fourth chamber 94 is transferred through conduit 131 to clarifier 133 for separation into purified liquid and activated sludge. The clarifier as shown in FIG. 5 includes rotatable scraper 134 at the lower end to prevent coning. The activated sludge is withdrawn through bottom conduit 129 and at least a portion thereof is recycled through pump 130 to the first oxygenation chamber for mixing with the wastewater and oxygen-containing feed gas. The purified liquid overflows the clarifier effluent weir and passes into the effluent trough, from which it is discharged from the clarifier through conduit 132.

Surface aeration devices are disposed in each of the oxygenation chambers in the FIG. 5 embodiment respectively comprising rotatable impellers 96, 97, 98 and 99 positioned at the liquor surface for mixing and continuous recirculation of the liquor against the oxygen-enriched atmosphere in the gas spaces of the associated chambers. The rotatable impellers are driven by motor drive means 110, 111, 112 and 113 by means of the shafts 135, 136, 137 and 138, respectively. The aerators in FIG. 5 differ from those previously described in connection with FIGS. 1, 2 and 4 in that the former have aerator shafts extending below the rotatable surface impellers down into the mixed liquor pool and are provided at their respective lower ends with subsurface mixing propellers 139, 140, 141 and 142. These subsurface propellers are employed to augment the mixing capability of the surface impellers, so that together they provide the required level of bulk fluid mixing necessary to maintain the sludge solids in suspension and to insure a uniform liquid composition. Such augmentation may be desirable when the oxygenation chambers are designed to be relatively deep, e.g., with a liquid depth of 10–25 feet.

The control system for the FIG. 5 system comprises load signal transmitting means 114 coupled to monitor the power draw of motor drive means 110, power transducer 115, and transducer output signal transmitting means 116, all operating in the same manner as previously described in connection with FIGS. 2, 3 and 4 to adjust the feed gas flow rate in response to the sensed power consumption of the first chamber surface aeration device, whereby the liquid level in the oxygen chambers is adjusted by the change in gas space pressure resulting from adjustment of the feed gas flow rate to maintain a predetermined power consumption. Also provided is a dissolved gas probe 117 with signal transmitting means 118 coupling the probe 117 and actuator/controller 105 on feed gas valve 104. In activated sludge practice probe 117 preferably of a type which generates a difference in electrical potential between an electrode immersed in the oxygenated liquid and a reference electrode isolated from the oxygenated liquid. The potential difference signal generated by probe 117 may then be transmitted by wire 118 directly to controller 105 for further adjustment of the feed gas flow rate in response to the sensed dissolved oxygen concentration so as to maintain a predetermined dissolved oxygen concentration in the liquid in first oxygenation chamber 91. With such coupling, actuator/controller 105 is preferably of an electrical type, and the coupling may be made in a manner well known to those skilled in the art. Alternatively, the signal transmitting means 118 could be suitably coupled directly with transducer 115, whereby the transducer output signal transmitted by means 116 would be properly modified by the sensed dissolved oxygen concentration. In either case, the dissolved oxygen sensing portion of the control circuit will act to further adjust the feed gas flow rate that would otherwise be set by the power consumption sensing portion of the control circuit. Thus, the dissolved oxygen concentration signal, indicative of oxygen demand of the liquid being treated, is used to alter the control signal so as to reset the system to a new value of power draw while the remainder of the control circuit automatically adjusts the oxygen-containing feed gas flow rate correspondingly.

At first glance, it might appear that the response of the above described system to a change in the desired power consumption level is opposite to the desired response. For example, if the desired power consumption level were reset to a higher value in response to the sensed dissolved oxygen concentration, the system must respond by reducing the oxygen gas flow rate, thereby allowing liquid level to rise so as to increase the submergence of the surface aeration devices. Thus, the introduction of more power is accompanied by a reduction in the oxygen gas flow rate, rather than an increase therein as is necessary to accommodate the greater oxygen requirement of the liquid under treatment. Such response is transient, however, and will prevail only until the total gas volume inventory in the system is reduced to a new value appropriate to the higher liquid level. With such reduction, the control system will automatically re-open the feed gas valve, establishing the feed gas flow at a rate higher than existed before the power draw was reset and reflecting the greater mass transfer capability of the surface aerator. Thus, the control system automatically adjusts the power draw of the surface aeration devices while maintaining overall aeration efficiency at an economically high level under all process conditions.

Even though the dissolved oxygen probe 117 is shown in the FIG. 5 embodiment as being located in the mixed liquor of the first oxygenation chamber 91, it is to be understood that other than first chamber locations could be suitably employed without affecting the basic mode of operation of the control system. Nevertheless, such first chamber location is preferred in practice to minimize the response time of the control system to changes in oxygen requirement of the influent liquid.

Figure 6:
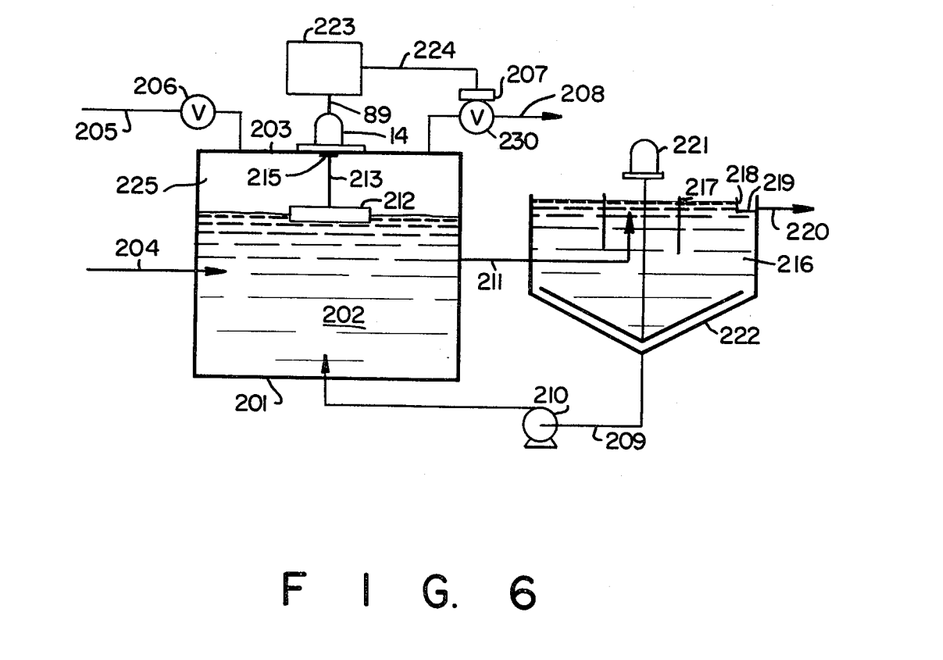
FIG. 6 is a schematic view taken in cross-sectional elevation of another embodiment of the invention similar to the embodiment of FIG. 2 but with vent gas flow control means.

FIG. 6 shows an oxygenation system according to another embodiment of the invention similar to that illustrated in FIG. 2 (and numbered correspondingly to FIG. 2 by addition of 200 to the reference numbers for the corresponding common system elements), but with the transducer coupled in controlling relationship with means for regulating the flow rate of oxygen-depleted gas discharged from the oxygenation chamber through the vent gas conduit. Thus, the vent gas conduit 208 has flow control means comprising control valve 230 and valve actuator/controller 207 disposed therein. The output control signal from transducer 223 is transmitted by signal transmitting means 224 to the vent gas discharge valve controller 207, to further close the control valve 230 when the sensed power consumption of the surface aeration increases and to further open the control valve when the sensed power consumption decreases. In addition to these control means, the feed gas conduit is provided with a flow control valve 206 therein, which may be either manual or automatic, as desired.

The response action, i.e., further opening or further closing of the control valve 230 in the FIG. 6 system is thus exactly opposite to the response action of the corresponding control valve 6 in the FIG. 2 system under the same process conditions. Nonetheless, both systems function in the same manner, by controlling the flow rate of gas passed through the oxygenation chamber in response to the sensed power consumption of the surface aeration means, thereby adjusting the liquid level in the chamber by change in gas pressure therein to maintain a predetermined power consumption.

In practice, the FIG. 2 single chamber oxygenation system is preferred over the single chamber system of FIG. 6 because the control system in the former case has a faster response time to changes in process conditions affecting the surface aerator submergence. The reason for such difference concerns the mass transfer of the oxygen gas to the liquor during the contacting step. Due to the overall net dissolution of gas in the oxygenation system, the vent gas flow rate will be only a small fraction of the oxygen gas feed rate. This in turn means that there is less volumetric flow of gas which may be utilized during a given time for control of aerator submergence in the FIG. 6 system than there is in the FIG. 2 system, if an economical utilization level for the oxygen gas is to be maintained in both systems, so that the time required to achieve a given control response is comparatively shorter in the latter case. For this reason the disposition of the transducer-connected flow control means in the feed gas conduit rather than the vent gas conduit is generally preferred in accordance with the practice of the present invention.

The present invention affords a wide flexibility in accommodating cyclic and seasonal variations in influent liquid flow rate and gas dissolution requirement of the liquid under treatment, as well as permanent, progressive increases in influent liquid flow rate over the life of the treatment plant. These changes in process conditions require only simple and quickly effected mechanical adjustments of the control system, e.g., adjustment of output signal settings on a transducer or limit stop settings on a flow control valve, in order to provide optimal performance of the gas-liquid contacting system.

Despite the fact that the invention has been described herein in application to oxygenation wastewater treatment systems, it will be appreciated that other process systems may readily be controlled by the means and method herein disclosed. Examples of other suitable types of processes include fermentation, solid catalyzed gas-liquid reaction, and absorptive gas purification.

Although preferred embodiments have been described in detail, it will be further appreciated that other embodiments are contemplated only with modification of the disclosed features, as being within the scope of the invention.

What is claimed is:

1. In an apparatus for controlled contacting of oxygen-containing gas and BOD-containing liquid including: a BOD-containing liquid storage enclosure; at least two separate oxygenation chambers within said storage enclosure each having walls extending substantially to the floor of said storage enclosure and also extending above the BOD-containing liquid level, and covers over the upper ends of said chamber walls to form gas spaces; conduit means for introducing oxygen-containing feed gas at superatmospheric pressure to one of said oxygenation chambers; conduit means for introducing BOD-containing feed liquid to the one oxygenation chamber; surface aeration means positioned within at least one of said oxygenation chambers for mixing and continuously recirculating BOD-containing liquid against said oxygen-containing gas for oxygenation of said liquid; restricted passageway means for flow of unconsumed oxygen gas from the gas space of said one oxygenation chamber to a second oxygenation chamber; restricted flow means for transferring the first oxygenated liquid to said second oxygenation chamber; gas vent conduit means for discharging oxygen-depleted gas from a final oxygenation chamber; flow control means for regulating the flow rate of oxygen-containing gas passed through said chambers; and liquid discharge means having an inlet positioned for submergence in the liquid in said final oxygenation chamber for discharging finally-oxygenated liquid from said final chamber, the improvement of means for maintaining liquid level in the oxygenation chambers at a predetermined value, comprising: means for sensing the power consumption of at least one of said surface aeration means; and means for transmitting signals from said power consumption sensing means to said flow control means for adjustment of the flow rate of gas passed through said chambers so as to vary the gas pressure in the chambers in response to the sensed power consumption level, such that (1) when the liquid level in a chamber falls below the predetermined value and sensed power consumption and gas pressure decrease, the flow rate of gas passed through the chamber is decreased to further reduce the gas pressure in the chamber and cause the liquid level to rise to the predetermined value and (2) when the liquid level in a chamber rises above the predetermined value and sensed power consumption and gas pressure increase, the flow rate of gas passed through the chambers is increased to further increase the gas pressure in the chambers and cause the liquid level to be depressed to the predetermined value, thereby maintaining liquid level and power consumption in the chambers at predetermined values, and wherein said flow control means are disposed in said feed gas conduit means to regulate the flow of oxygen-containing feed gas introduced to said one oxygenation chamber, and further comprising discharge flow control means in said vent conduit means; means for sensing the oxygen concentration of the oxygen-depleted gas in said vent conduit; and means for transmitting signals from said oxygen concentration sensing means to said vent conduit discharge flow control means for adjustment of the discharge gas flow rate to maintain a predetermined oxygen concentration in said oxygen-depleted discharge gas.

2. Apparatus according to claim 1 with means for sensing the dissolved oxygen concentration of liquid in one of said oxygenation chambers; and means for transmitting signals from said dissolved oxygen concentration sensing means to said flow control means for further adjustment of the flow rate of oxygen-containing gas passed through said oxygenation chambers to maintain a predetermined dissolved oxygen concentration.

3. In a process for continuously contacting BOD-containing liquid with oxygen-containing gas in the presence of activated sludge by the steps of: flowing BOD-containing feed liquid and oxygen-containing feed gas at superatmospheric pressure, and activated sludge into a first enclosed covered oxygenation zone containing a body of liquid and a body of gas thereabove; mixing said BOD-containing water and activated sludge as first liquor and feed gas and simultaneously continuously recirculating said liquor by projecting it into the overlying gas to effect surface aeration contacting of said gas and liquor in the zone and form first oxygenated liquor and first unconsumed oxygen-containing gas; discharging said first oxygenated liquor and first unconsumed oxygen-containing gas from said first zone; mixing the discharged first unconsumed oxygen-containing gas with the discharged first oxygenated liquor and simultaneously continuously recirculating said first oxygenated liquor by projecting it into the overlying gas to effect surface aeration contacting of said first gas and first liquor in at least a second enclosed covered oxygenation zone containing a body of liquid and a body of gas thereabove to form at least a second oxygenated liquor and second unconsumed oxygen-containing gas of lower oxygen purity than said first gas; discharging oxygen-depleted gas from a final enclosed covered aeration zone; and separately discharging finally oxygenated liquor from said final oxygenation zone through a submerged discharge opening, the improvement of maintaining liquid level in the oxygenation zones at a predetermined value by the steps comprising: (a) sensing the power consumed for mixing and recirculation in at least one of the surface aeration contacting steps; (b) converting the power consumption sensing into a transmittable signal; and (c) adjusting the flow rate of gas passed through said oxygenation zones by means of the transmitted power consumption signal so as to vary the gas pressure in the oxygenation zones in response to the sensed power consumption level, such that (1) when the liquid level in an oxygenation zone falls below the predetermined value and sensed power consumption and gas pressure decrease, the flow rate of gas passed through the oxygenation zones is decreased to further reduce the gas pressure in the oxygenation zones and cause the liquid level to rise in the predetermined value and (2) when the liquid level in an oxygenation zone rises above the predetermined value and sensed power consumption and gas pressure increase, the flow rate of gas passed through the oxygenation zone is increased to further increase the gas pressure in the oxygenation zones and cause the liquid level to be depressed to the predetermined value, whereby liquid level and power consumption in the oxygenation zones are maintained at predetermined values, and wherein the flow rate of the oxygen-containing feed gas flowed into said first oxygenation zone is adjusted as the gas flow rate adjusting of step (a), and comprising the further steps of: sensing the oxygen concentration of the oxygen-depleted gas discharged from said final oxygenation zone; converting said oxygen concentration sensing into a transmittable signal; and adjusting the discharge flow rate of said oxygen-depleted gas by means of the transmitted oxygen concentration signal to maintain a predetermined oxygen concentration in said oxygen-depleted gas.

4. A process according to claim 3, wherein said oxygen concentration is maintained between 20 and 50% by volume.

5. A process according to claim 3, comprising the steps of: sensing the dissolved oxygen concentration of the oxygenated liquor in one of said oxygenation zones; converting said dissolved oxygen concentration into a transmittable signal; and further adjusting the flow rate of oxygen-containing feed gas to said first oxygenation zone by means of the transmitted dissolved oxygen concentration signal to maintain a predetermined dissolved oxygen concentration is said oxygenated liquor.

6. A process according to claim 5, wherein the dissolved oxygen concentration of oxygenated liquor is sensed in said first oxygenation zone.

7. A process according to claim 5, wherein said dissolved oxygen concentration is maintained between 3 and 10 mg/liter.

* * * * *